US007438455B2

(12) United States Patent
Ono et al.

(10) Patent No.: US 7,438,455 B2
(45) Date of Patent: Oct. 21, 2008

(54) VEHICLE LAMP

(75) Inventors: Shigeki Ono, Shizuoka (JP); Masaru Takiguchi, Shizuoka (JP); Mamoru Murakoshi, Shizuoka (JP); Kazuhiro Yamazaki, Shizuoka (JP); Akio Ishigaki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 89 days.

(21) Appl. No.: 11/228,049

(22) Filed: Sep. 15, 2005

(65) Prior Publication Data

US 2006/0062009 A1 Mar. 23, 2006

(30) Foreign Application Priority Data

Sep. 17, 2004 (JP) .......................... P.2004-272344

(51) Int. Cl.

| | |
|---|---|
| ***F21V 1/00*** | (2006.01) |
| ***F21V 7/00*** | (2006.01) |
| *B32B 27/00* | (2006.01) |
| *B05D 5/12* | (2006.01) |

(52) U.S. Cl. ....................... 362/509; 362/311; 427/125; 428/450

(58) Field of Classification Search ................. 362/311, 362/351, 509–511; 428/429, 447, 450, 451; 427/125
See application file for complete search history.

(56) References Cited

U.S. PATENT DOCUMENTS

| | | | | |
|---|---|---|---|---|
| 6,488,394 | B1 * | 12/2002 | Mabe et al. | 362/510 |
| 6,541,537 | B1 * | 4/2003 | Catena | 522/150 |
| 6,637,920 | B2 | 10/2003 | Murakoshi et al. | 362/516 |
| 7,172,663 | B2 * | 2/2007 | Hampden-Smith et al. | 148/537 |
| 2003/0143342 | A1 | 7/2003 | Fujii et al. | |
| 2004/0086728 | A1 * | 5/2004 | Maruoka et al. | 428/447 |

FOREIGN PATENT DOCUMENTS

JP 2000-106017 4/2000

OTHER PUBLICATIONS

Lee et al., *Application of Diamond-like Carbon*, Advanced Materials Industry, No. 124, pp. 39-42; column 3.2, Mar. 2004.

* cited by examiner

*Primary Examiner*—John A Ward
(74) *Attorney, Agent, or Firm*—Fish & Richardson P.C.

(57) ABSTRACT

A reflecting member of a vehicle lamp is provided with a top coat layer formed on a silver deposited coat formed on a surface of a synthetic resin base. The top coat layer is made of a transparent acrylic resin which is synthesized with a monomer whose glass transition temperature is 60° C. or higher. The top coat layer adheres to the silver deposited coat to suppress the agglomeration of Ag atoms constituting the silver deposited coat.

6 Claims, 7 Drawing Sheets

FIG. 4

| | | Nd | Bi | Cu | Au(Pd) |
|---|---|---|---|---|---|
| Resistance to agglomeration | thermal factor | A | B | D | D |
| | electrochemical factor | D | A | D | B |
| crystalline particle size reduction | | B | B | B | D |
| reflectivity reduction | | B | B | B | B |
| thermal conductivity reduction | | B | B | B | B |

Category( A: Excellent > B: Good > C: >Fair D: Bad)

FIG. 5

| Compositions | Thermal Conductivity (W/m·k) | Reflectivity (%) | Thermal Resistance | Resistance to NaCl |
|---|---|---|---|---|
| Ag - Bi | A(251) | A(94.2) | B | A |
| Ag - Nd - Cu | C(129) | B(87.8) | A (250~300°C) | C |
| Pure Ag | A(314) | A(94.5) | D | D |

Category( A: Excellent > B: Good > C: >Fair D: Bad)

FIG. 7

| Types of top coats | Monomer physical properties (glass transition temperature) | Color difference posterior to thermal resistance test | Judgment |
|---|---|---|---|
| | | 160°C × 980 hours and later | Pass standard of 3.0 or smaller |
| Comparison example | 27°C | 14.8 | NG |
| Sample 1 | 60°C | 2.9 | PASS |
| Sample 2 | 64°C | 2.9 | PASS |
| Sample 3 | 69°C | 2.5 | PASS |

VEHICLE LAMP

The present application claims foreign priority based on Japanese Patent Application No. P.2004-272344, filed on Sep. 17, 2004, the contents of which are incorporated herein by reference.

BACKGROUND OF THE INVENTION

1. Field of the Invention

The present invention relates to a vehicle lamp having a reflecting member in a lamp compartment.

2. Related Art

As reflectors used for vehicle lamps such as headlamps which require high luminous intensity and extension reflectors which are disposed as decorative members in such a manner as to surround reflectors, there are known reflectors and extension reflectors in which a reflecting surface is made up of an aluminum deposited coat by applying an aluminum vapor deposition treatment to a surface of a synthetic resin base. In addition, since a high constant regular reflectivity of about 90% can be obtained on the aluminum deposited reflecting surface, such aluminum deposited reflecting surfaces are widely used not only for headlamps but also for other vehicle lamps.

However, there still exists a loss in regular reflectivity of on the order of 10% on the aluminum deposited reflecting surface, and hence there has been a demand for a further improvement in regular reflectivity.

Then, on the advent of development of a silver deposited coat having a high regular reflectivity (99%) for use for reflecting surfaces of indoor illumination appliances, a study was started on the application of the developed silver deposited coat to reflecting surfaces of reflecting members of vehicle lamps. However, the silver deposited coat reacts (generates silver oxide and silver sulfide) when contacting water, oxygen (heated oxygen) and sulfur dioxide gas (sweat, exhaust emissions) in the atmosphere to thereby be easily discolored (yellowed) and corroded, leading to a remarkable reduction in regular reflectivity.

Then, proposed in JP-A-2000-106017 (see FIG. 9) is a top coat layer 3 and an under coat layer 4, which are made of a modified silicone resin having superior gas barrier properties under high temperatures, and formed to be superposed on a silver deposited coat 2 formed on a surface of a synthetic resin base 1, so that the top coat layer 3 and the under coat layer 4 function as gas barriers against water, oxygen (heated oxygen) and sulfur dioxide gas (sweat, exhaust emissions) which are contained in the atmosphere so as to suppress the discoloration and corrosion of the silver deposited coat 2, the high regular reflectivity being thereby maintained.

In the reflector of JP-A-2000-106017 which utilizes the gas barrier properties of the top coat layer and the under coat layer which are made of the modified silicone resin, however, while the top coat layer and the under coat layer are effective to a certain extent in suppressing the discoloration (yellow discoloration) of the silver deposited reflecting surface (the silver deposited coat), there was caused a problem that discoloration and corrosion occur after many hours have elapsed (a heat resistance test of 400 hours), thereby reducing the regular reflectivity.

A study carried out by the inventor disclosed a fact that the cause for the discoloration (yellow discoloration) was attributed not only to the contact of the gases (moisture, oxygen and sulfur dioxide gas) in the atmosphere with Ag atoms but also to the agglomeration of Ag atoms making up the silver deposited coat as a result of vibration (migration) of the Ag atoms by thermal energy.

Namely, as shown in FIG. 10, when subjected to thermal energy, Ag atoms (crystalline particles of Ag) constituting the silver deposited coat formed on the surface of the base vibrate relatively from an original state in which they are arranged in a proper fashion and agglomerate together at certain locations to thereby form fine irregularities on the surface of the silver deposited coat. Then, since light (blue) with a short wave range is absorbed and light (yellow to red) with a long wave range is reflected on areas where such fine irregularities are formed, the whole of silver deposited coat looks yellow.

SUMMARY OF THE INVENTION

One or more embodiments of the present invention propose a vehicle lamp in which an acrylic resin that is synthesized with a monomer having a glass transition temperature of 60° C. or higher is used as the top coat layer which covers a silver deposited coat, and the silver deposited coat is made of not pure silver but a silver alloy which contains at least Nd among Nd, Bi and Au, so that Ag atoms do not agglomerate even in the event that they are subjected to thermal energy (fine irregularities are not formed on the surface of the silver deposited coat), and consequently the discoloration (yellow discoloration) of the silver deposited coat does not occur, causing no reduction in regular reflectivity due to the discoloration (yellow discoloration) of the silver deposited coat.

In addition, one or more embodiments of the present invention provide a vehicle lamp including a reflecting member with a silver deposited reflecting surface which can maintain a high regular reflectivity that cannot be obtained by the aluminum deposited reflecting surface over a long period of time.

In accordance with one or more embodiments of the present invention, a vehicle lamp is provided with a reflecting member in which a top coat layer, which functions as a protective coat, is formed on a silver deposited coat formed on a surface of a synthetic resin base, wherein the top coat layer is made of a transparent acrylic resin which is synthesized with a monomer having a glass transition temperature of 60° C. or higher.

Note that the glass transition temperature means a temperature at which a change occurs in which when a material which remains as liquid at high temperatures is drastically cooled so that the temperature thereof is reduced to a certain temperature, the viscosity of the material is increased so that the material loses its fluidity to thereby become an amorphous solid (it is also referred to as a temperature resulting just before fluidity is generated from a glassy state). In general, in the same resin system, the heat resistance becomes more superior at the glass transition temperature becomes higher.

In the vehicle lamp, the regular reflectivity of the silver deposited coat (a silver system resin formed on the surface of the synthetic resin base by sputtering) which is covered by the top coat layer (the transparent acrylic resin which is synthesized with the monomer whose glass transition temperature is 60° C. or higher) is about 95%. In addition, the silver deposited reflecting surface provides a color of calm pale yellow which is different from the aluminum deposited reflecting surface which exhibits a strong silvery color.

In addition, as shown in FIG. 7, it is understood from the fact that the color difference of the silver deposited coat after the heat resistance test is desirably 3.0 or smaller than the top coat layer (the transparent acrylic resin which is synthesized with the monomer with the glass transition temperature of 60°

C. or higher) on the silver deposited coat is effective in suppressing the reduction in regular reflectivity due to the yellow discoloration of the silver deposited coat, and the suppressing function of the yellow discoloration of the silver deposited coat by the top coat layer (the transparent acrylic resin which is synthesized with the monomer with the glass transition temperature of 60° C. or higher) can be explained as follows.

Namely, while, when the silver deposited coat formed on the surface of the base is subjected to high temperatures, the Ag atoms (crystalline particles of Ag) constituting the silver deposited coat receive thermal energy and attempt to vibrate relatively so as to agglomerate together at certain locations as shown in FIG. 10, since part of acryl molecules constituting the acrylic resin enter gaps between Ag atoms (crystalline particles of Ag) so as to be integrated with the Ag atoms closely and strongly at an interface between the top coat layer (the transparent acrylic resin which is synthesized with the monomer with the glass transition temperature of 60° C. or higher) and the silver deposited coat as shown in FIG. 6B, the vibration of the Ag atoms which are subjected to thermal energy is restrained, whereby the agglomeration of the Ag atoms is suppressed and hence no fine irregularity is formed on the surface of the silver deposited coat.

In other words, since the Ag atoms constituting the silver deposited coat are held as uniformly dispersed without being caused to agglomerate (the crystal lattice of Ag atoms is held as remaining in the original form in which Ag atoms are arranged in a proper fashion) even in the event that the atoms are subjected to thermal energy, the silver deposited coat looks yellow in no case, and no reduction in regular reflectivity due to the yellow discoloration occurs.

In addition, the top coat layer (the transparent acrylic resin which is synthesized with the monomer with the glass transition temperature of 60° C. or higher) formed on the silver deposited coat functions as a gas barrier against gases (water, oxygen and sulfur dioxide) in the atmosphere under high temperature conditions, whereby the contact of gases (water, oxygen and sulfur dioxide) in the atmosphere with the silver deposited coat is restrained, the discoloration (yellow discoloration) and corrosion of the silver deposited coat being thereby prevented.

Moreover, in accordance with one or more embodiments of the present invention, in the above-described construction, the silver deposited coat may be made of a silver alloy which contains at least Nd among Nd, Bi and Au (Pd).

As shown in FIG. 3, Nd is effective in suppressing the reduction in regular reflectivity due to thermal stress on the silver deposited coat, and in particular, with a content of 0.2 or more atomic % of Nd, the regular reflectivity of about 95% can be maintained. In addition, since, when the Nd content exceeds 1.0 atomic %, the initial reflectivity of the silver deposited coat is reduced and the silver deposited coat itself starts to be yellowed, the content of Nd is desirably in the range of 0.2 to 1.0 atomic %. Note that the Nd content of 0.2 atomic % means a ratio (rate) of the number of Nd atoms against the total number of metallic atoms that constitute the silver deposited coat.

In addition, the function of Nd in the silver alloy which contains Nd of suppressing the reduction in regular reflectivity of the silver deposited coat will be explained as follows.

Namely, while, when the silver deposited coat formed on the surface of the base is subjected to high temperatures, the Ag atoms (crystalline particles of Ag) constituting the silver deposited coat receive thermal energy and attempt to vibrate relatively so as to agglomerate together at certain locations as shown in FIG. 10, due to the fact that Nd atoms exist in the crystal lattice of Ag atoms (crystalline particles of Ag) in a dispersed fashion, as shown in FIG. 6A, no such large void as allowing the vibrating migration of Ag atoms (crystalline particles of Ag) is formed in the crystal lattice of Ag atoms (crystalline particles of Ag), and hence Ag atoms (crystalline particles of Ag) are made difficult to agglomerate.

In other words, while, when large Nd atoms (1.82 angstroms) exist in the crystal lattice of Ag atoms (1.44 angstroms), the crystal lattice of Ag atoms (1.44 angstroms) distorts to form small voids at some locations, as shown in FIG. 6A, since the voids are trapped in internal stress fields (around Nd atoms), no such large void as being exchangeable in position with Ag atoms is formed in the crystal lattice of Ag atoms (crystalline particles of Ag). Due to this, Ag atoms (crystalline particles of Ag) which are subjected to thermal energy cannot vibrate (migrate) sufficiently, and the agglomeration of Ag atoms is suppressed, whereby no fine irregularity is formed on the surface of the silver deposited coat, and hence there is caused no reduction at all in regular reflectivity due to the yellow discoloration.

Furthermore, as has been described above, since part of acryl molecules constituting the acrylic resin enter gaps between Ag atoms (crystalline particles of Ag) so as to be integrated with the Ag atoms closely and strongly at the interface between the top coat layer (the transparent acrylic resin which is synthesized with the monomer with the glass transition temperature of 60° C. or higher) and the silver deposited coat, the agglomeration of Ag atoms is suppressed-further, and hence there is caused no reduction at all in regular reflectivity due to the yellow discoloration.

In addition, as shown in FIGS. 4, 5, there are Bi, Cu, Au (Pd) as additives other than Nd, Bi and Cu also have the same function as that of Nd of suppressing the agglomeration of Ag atoms (crystalline particles of Ag).

Moreover, in accordance with one or more embodiments of the present invention, in the above-described construction, a DLC layer (a diamond like carbon layer: a carbon layer having a quality as exhibited by diamond) may be formed on the top coat layer.

Since the DLC layer which covers the top coat layer is superior in durability, heat resistance and gas barrier properties and moreover has superior adhesion properties to acrylic resin which constitutes the top coat layer, the discoloration and corrosion of the silver deposited coat are prevented further.

Moreover, in accordance with one or more embodiments of the present invention, in the above-described construction, the reflecting member may be an extension reflector.

While a headlamp reflector and an extension reflector are common in that both are reflecting members disposed within a lamp compartment, the headlamp reflector, which is exposed to direct light from a bulb functioning as a light source, requires a sufficient heat resistance (180° C.), whereas the extension reflector, which is disposed in such a manner as to surround the reflector and hence is not heated to such a high temperature as that of the reflector, only has to have a lower heat resistance (160° C.) than that required for the reflector, which is sufficient as the heat resistance required therefor. Therefore, the discoloration and corrosion are prevented from occurring on the silver deposited coat which makes up the reflecting surface of the extension reflector in an ensured fashion.

Consequently, for example, on the headlamp, while the extension reflector, which is adapted to conceal a gap between the reflector in which the light source is installed and a front opening in the lamp body, is provided around the periphery of the reflector so as to function to improve the appearance by making the whole of the lamp body (the lamp compartment)

look as exhibiting the color of mirror surface, the whole of the silver deposited reflecting surface of the extension reflector which surrounds the aluminum deposited reflecting surface of the reflector looks as exhibiting a silver-tinted color with a calm pale yellowish cast.

In accordance with one or more embodiments of the present invention, a reflecting member of a vehicle lamp is provided with a synthetic resin base; a silver deposited coat formed on a surface of the synthetic resin base; and a top coat layer formed on the silver deposited coat and made of a transparent acrylic resin synthesized with a monomer having a glass transition temperature of 60° C. or higher. Therefore, the vehicle lamp can be obtained in which the silver deposited reflecting surface of the reflecting member is free from discoloration (yellow discoloration) and corrosion and hence a high regular reflectivity is maintained over a long period of time and the reflecting member is allowed to look as exhibiting a slightly yellowish warm mirror-surface color when the lamp is turned off.

Further, in accordance with one or more embodiments of the present invention, the silver deposited coat is made of a silver alloy containing Neodymium (Nd). Therefore, the discoloration (yellow discoloration) of the silver deposited reflecting surface of the reflecting member is prevented, and hence the high regular reflectivity on the silver deposited reflecting surface is maintained over a long period of time in an ensured fashion. Further, the silver alloy may further contain at least one of Bismuth (Bi), Copper (Cu), Gold (Au), and Lead (Pd).

Further, in accordance with one or more embodiments of the invention, the reflecting member may further be provided with a DLC layer formed on the top coat layer. Therefore, the discoloration and corrosion of the silver deposited reflecting surface of the reflecting member is prevented, and hence the high regular reflectivity on the silver deposited reflecting surface is maintained over a longer period of time in an ensured fashion.

Further, in accordance with one or more-embodiments of the present invention, the reflecting member may be an extension reflector. Since the reflecting surface of the extension reflector is free from the discoloration (yellow discoloration) and corrosion, so that the high regular reflectivity is maintained over a long period of time, the vehicle lamp is provided which ensures over a long period of time the state in which the slightly yellowish warm mirror-surface color is allowed to be seen.

In particular, in the event that the invention is applied to a headlamp, since the whole of the periphery of the aluminum deposited reflecting surface of the reflector is allowed to be seen exhibiting the calm pale silver-tinted color of the silver deposited surface of the extension reflector, thereby making it possible for the headlamp to which the invention is applied to be differentiated from the conventional headlamp having a glittering image in which the whole of the lamp body shines brightly owing to the aluminum deposited reflecting surfaces of the reflector and the extension reflector.

Other aspects and advantages of the invention will be apparent from the following description and the appended claims.

BRIEF DESCRIPTION OF THE DRAWINGS

FIG. 4 is a drawing showing characteristics of elements added into the silver alloy.

FIG. 5 is a drawing showing thermal conductivity, reflectivity, heat resistance and resistance to NaCl of Ag/Bi alloy, Ag/Nd/Cu alloy and pure Ag.

FIG. 7 is a drawing showing glass transition temperatures and results (color differences) of heat resistance tests of examples (samples) 1 to 3 of the invention and a comparison example. with respect to glass transition temperature and results of heat resistance tests.

DESCRIPTION OF THE PREFERRED EMBODIMENTS

Embodiments of the invention will be described with reference to the accompanying drawings.

Figure 1:
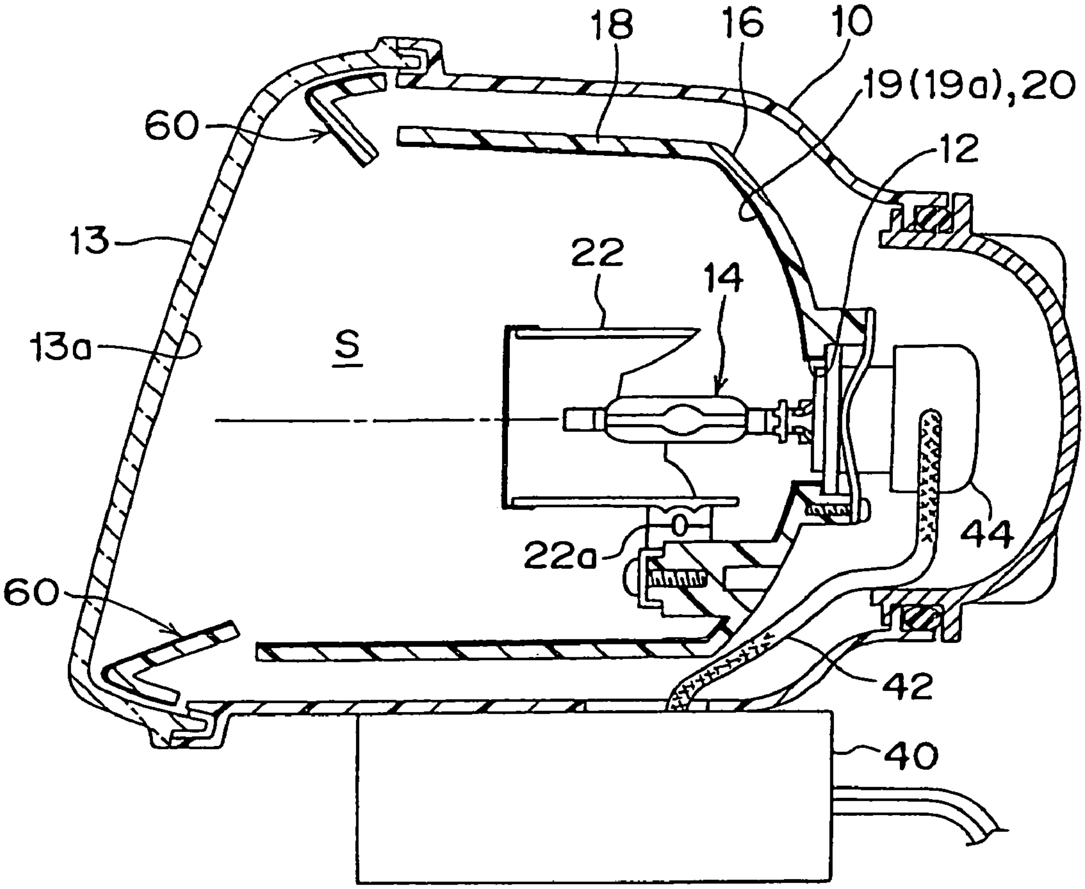
FIG. 1 is a vertical sectional view of an automotive headlamp.
Figure 2:
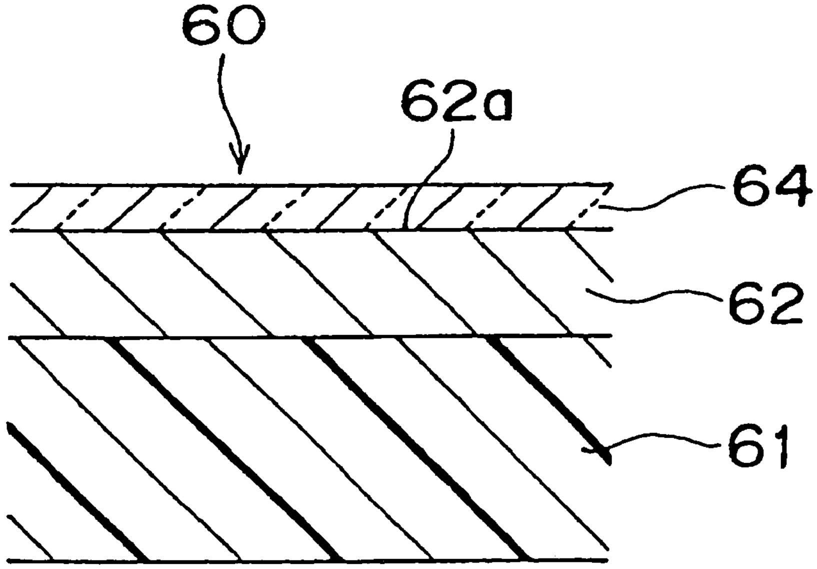
FIG. 2 is an enlarged sectional view of a reflecting surface of an extension reflector provided in the headlamp of FIG. 1.
Figure 3:
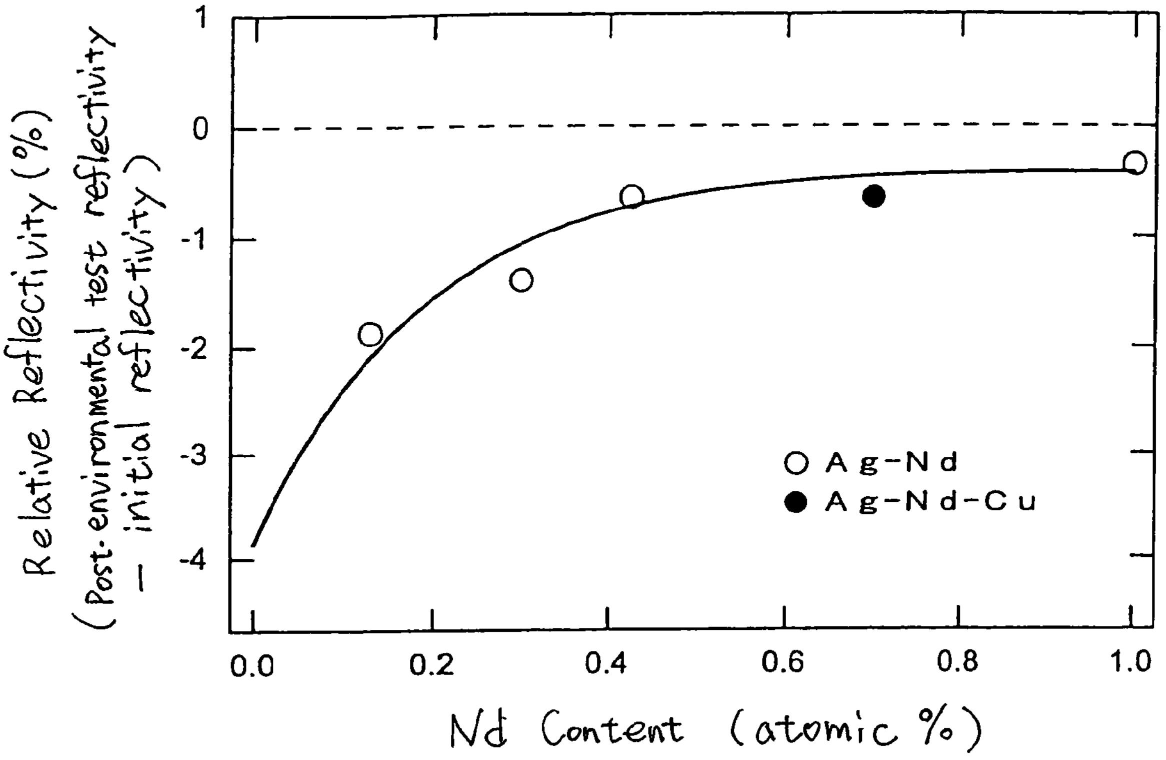
FIG. 3 is a drawing showing a correlation between an amount of Nd added into an Ag/Nd alloy and the reflectivity of a silver alloy deposited reflecting surface.

FIGS. 1 to 7 are drawings showing an embodiment of the invention. FIG. 1 is a vertical sectional view of an automotive headlamp according to an embodiment of the invention. FIG. 2 is an enlarged sectional view of a reflecting surface of an extension reflector provided in the headlamp of FIG. 1. FIG. 3 is a drawing showing a correlation between an amount of Nd added into an Ag/Nd alloy and the reflectivity of a silver alloy deposited reflecting surface. FIG. 4 is a drawing showing characteristics of elements added into the silver alloy. FIG. 5 is a drawing showing thermal conductivity, reflectivity, heat resistance and resistance to NaCl of Ag/Bi alloy, Ag/Nd/Cu alloy and pure Ag. FIG. 6A is a drawing explaining a function in which an Nd atom in a sliver deposited coat suppresses the agglomeration of Ag atoms (crystalline particles of Ag). FIG. 6B is a drawing explaining a function in which acryl molecules in a top coat layer suppress the agglomeration of Ag atoms (crystalline particles of Ag). FIG. 7 is a drawing showing comparisons among experimental examples of the invention with respect to glass transition temperature and results of heat resistance tests (color difference).

In FIG. 1, reference numeral 10 denotes a lamp body which is formed into the shape of a container made of a synthetic resin, and a front lens 13 is assembled to a front opening in the lamp body 10 to thereby define a lamp compartment S. A parabolic reflector 16 of a synthetic resin, in which a discharge bulb 14 is installed as a light source, is provided within the lamp compartment S. Reference numeral 12 denotes a bulb inserting and attaching hole formed in a rear crest portion of the reflector 16, and the discharge bulb 14 is installed therein.

A shade 22 is disposed in front of the bulb 14 for preventing the generation of glare and forming a clear cut-off line for a dip beam. Reference numeral 22*a* denotes a leg of the shade 22 which is fixedly screwed to the reflector 16. Then, light emitted from the bulb 14 is reflected on an effective reflecting surface of the reflector 16 and the emitted light so reflected is distributed in predetermined directions by a distribution control step 13*a* formed on a rear side of the front lens 13, whereby a light distribution for the dip beam is formed.

Reference numeral 40 denotes a heavy starter and ballast circuit unit which integrally accommodate therein a starter circuit for initiating a discharge between electrodes of an arc tube by energizing the discharge bulb (of the arc tube) 14 with a high voltage and a ballast circuit for effecting a continued stable discharge between the electrodes of the arc tube, and the starter and ballast circuit unit 40 is fixed to an external side of a lower wall of the lamp body 40, an output cable 42 extending from an illumination circuit of the unit 40 being connected to the discharge bulb 14 via a connector 44.

The reflector 16, with which the bulb 14 is inserted and attached so as to be integrated, is supported in such a manner as to be tilted around a tilting axis connecting a fixed tilting fulcrum to a ball joint construction and a pair of longitudinal moving fulcrums by means of an aiming mechanism (not shown) made up of the fixed tilting fulcrum and the longitudinal moving fulcrums. An extension reflector 60 is provided in front of a front edge of the opening in the lamp body 10 within the lamp compartment S in such a manner as to extend in a frame-like fashion along a front edge of the reflector 16 so as to conceal a gap between the reflector 16 and the lamp body 10.

The reflector 16 is provided with a reflecting surface 19*a* made up of an aluminum deposited coat 19 with a regular reflectivity of 90% is formed on a surface of an FRP reflector base 18 and a top coat layer 20, which is a protective coat made of a transparent acrylic resin, is formed on the reflecting surface 19*a*.

On the other hand, as shown in FIG. 2, the extension reflector 16 has a construction in which a reflecting surface 62*a* made up of a silver deposited coat 62 with a regular reflectivity of 95% is provided on a surface of a PBT/PET reflector base 61 and a top coat layer 64 made of a transparent acrylic resin is formed on the reflecting surface 62*a*.

Consequently, in this embodiment, when the headlamp is turned off, internal and external perimeters of the lamp compartment S are seen as exhibiting a calm pale silver-tinted color (a silver color with a slight yellowish cast) which has never been provided by conventional headlamps due to a shade inherent in the sliver deposited reflecting surface 62*a* of the extension reflector 60 which encompasses the aluminum deposited reflecting surface 19*a* of the reflector 16.

Namely, in the embodiment, within the lamp compartment S when the headlamp is turned off, the whole of the periphery of the aluminum deposited reflecting surface 19*a* of the reflector 16 is seen as exhibiting the calm pale silver-tinted color due to the silver deposited reflecting surface 62*a* of the extension reflector 60, whereby an unconventional image is obtained which is clearly differentiated from the glittering image of the conventional headlamps in which the whole of the lamp compartment shines in a silvery color by virtue of the aluminum deposited reflecting surfaces of the reflector and the extension reflector which encompasses the reflector, respectively.

Next, the construction of the silver deposited reflecting surface 62*a* of the extension reflector 60 will be described in detail.

As has been described before, while the silver deposited reflecting surface 62*a* has the construction in which the silver deposited coat 62 and the top coat layer 64 are integrally superposed on the surface of the PBT/PET reflector base 61, the discoloration (yellow discoloration) and corrosion of the silver deposited reflecting surface 62*a* are prevented by adopting the following configuration so that a high regular reflectivity which is provided when the silver deposited reflecting surface 62*a* is initially formed can be held over a long period of time.

In the first place, the top coat layer 64, which is the protective coat formed on the silver deposited coat 62 formed on the surface of the PBT/PET reflector base 61, is made of the transparent acrylic resin which is synthesized with a monomer with a glass transition temperature of 60° C. or higher so as to suppress the agglomeration of Ag atoms when thermal energy is applied thereto, which is considered as one of factors which causes the yellow discoloration of the silver deposited reflecting surface 62*a*.

Figure 6B:
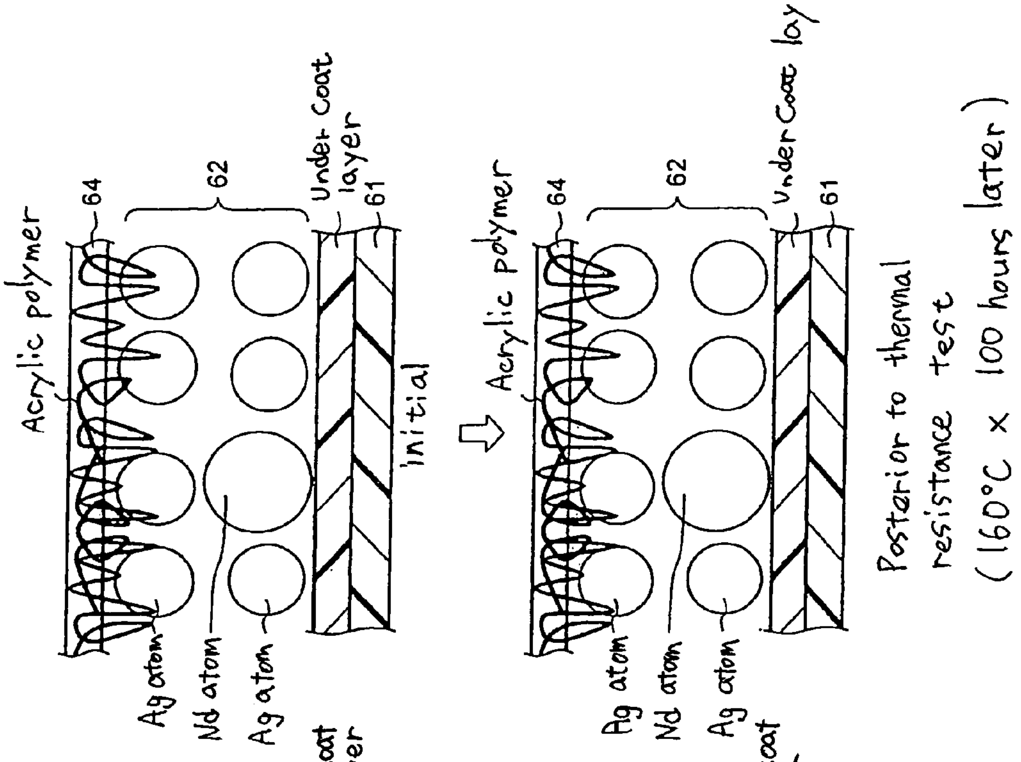
FIG. 6B is a drawing explaining a function in which acryl molecules in a top coat layer suppress the agglomeration of Ag atoms (crystalline particles of Ag).
Figure 10:
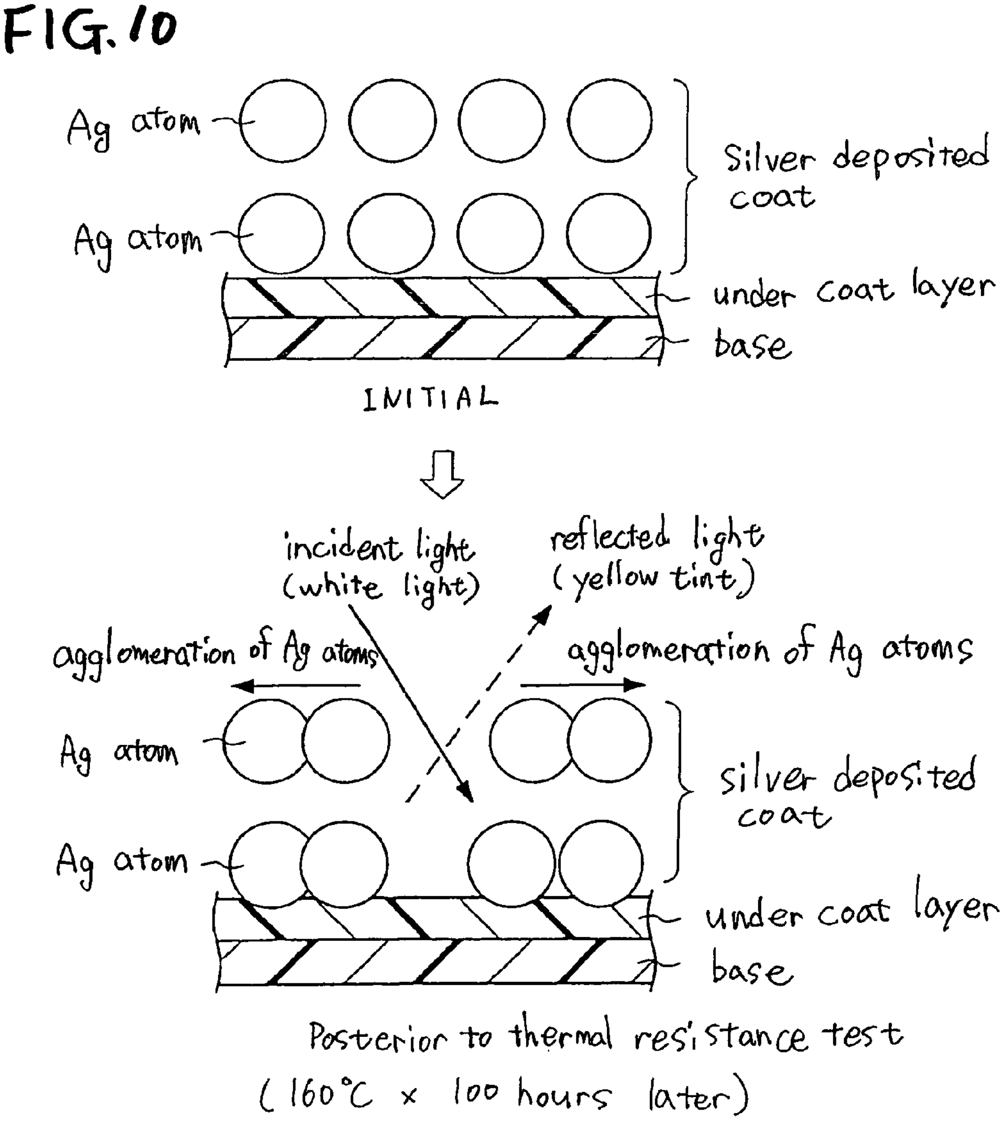
FIG. 10 is an explanatory drawing which explains a function in which Ag atoms constituting a silver deposited coat formed on a surface of a base receive thermal energy and start to vibrate to agglomerate together.

Namely, when the silver deposited coat 62 formed on the surface of the base 61 is exposed to high temperatures, while Ag atoms (crystalline particles of Ag) constituting the silver deposited coat receive thermal energy and then attempt to vibrate relatively to thereby agglomerate at some locations as shown in FIG. 10, since part of acryl molecules constituting the acrylic resin enter gaps between Ag atoms (crystalline particles of Ag) so as to be integrated with the Ag atoms closely and strongly at an interface between the top coat layer (the transparent acrylic resin which is synthesized with the monomer with the glass transition temperature of 60° C. or higher) and the silver deposited coat as shown in FIG. 6B, the vibration of the Ag atoms which are subjected to thermal energy is restrained, whereby the agglomeration of the Ag atoms is suppressed and hence no fine irregularity is formed on the surface of the silver deposited coat 62.

Namely, since the Ag atoms constituting the silver deposited coat are held as uniformly dispersed without being caused to agglomerate (the crystal lattice of Ag atoms is held as remaining in the original form in which Ag atoms are arranged in a proper fashion) even in the event that the atoms are subjected to thermal energy, the silver deposited coat looks yellow in no case, and no reduction in regular reflectivity due to the yellow discoloration occurs.

In the second place, the silver deposited coat 62 is such as to be formed by vapor depositing through sputtering not pure silver but a silver alloy in which Nd, Bi and Au are added in predetermined amounts to Ag onto the surface of the PBT/PET reflector base 61 and is such as to be constituted by a silver alloy of, for example, Ag (98%), Nd (0.2 atomic %), Bi (1.0 atomic %) and Au (0.6 atomic %), whereby the agglomeration of Ag atoms when thermal energy is applied thereto is suppressed.

Namely, FIG. 3 is a drawing illustrating a correlation between the amount of Nd added in the Ag/Nd alloy and the reflectivity on the silver alloy deposited reflecting surface, and as is seen from the drawing, in pure silver to which no Nd is added, since the reduction in reflectivity posterior to environmental test is remarkable relative to the initial reflectivity, the relative reflectivity (post-experimental test reflectivity—initial reflectivity) indicates a low value (−4). Then, since the relative reflectivity decreases as the amount of Nd added increases, it is understood that Nd is effective in suppressing the reduction in regular reflectivity of the sliver deposited coat. In particular, in the event that 0.2 or more atomic % of Nd is contained, the relative reflectivity falls within 2%, and a regular reflectivity of about 95% can be maintained. Then, this function of Nd to suppress the agglomeration of Ag atoms when thermal energy is applied thereto can be explained as follows.

Figure 6A:
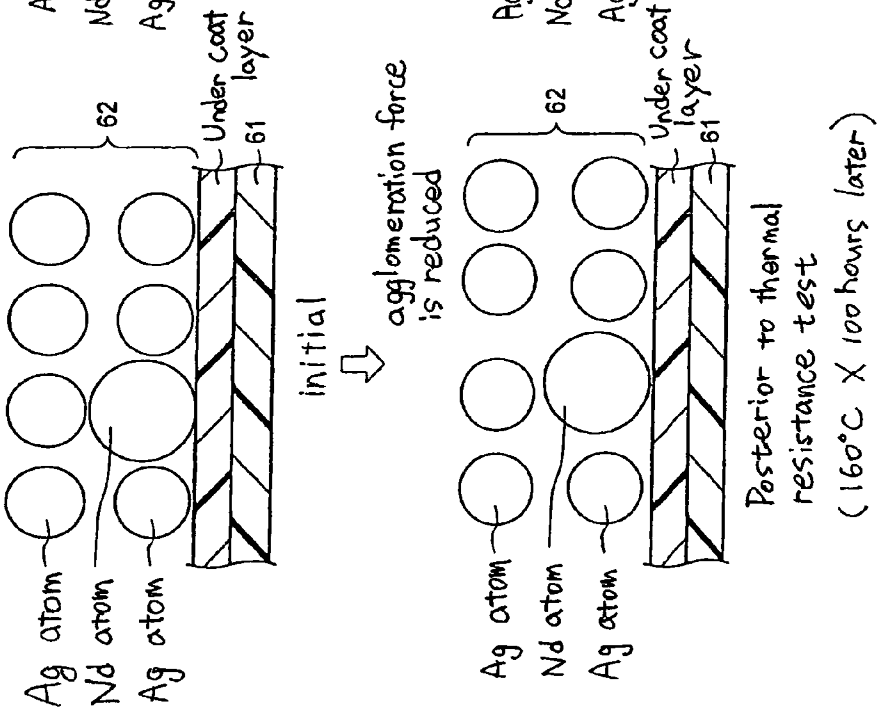
FIG. 6A is a drawing explaining a function in which an Nd atom in a sliver deposited coat suppresses the agglomeration of Ag atoms (crystalline particles of Ag).

Namely, while, when the silver deposited coat formed on the surface of the base is subjected to high temperatures, the Ag atoms (crystalline particles of Ag) constituting the silver deposited coat receive thermal energy and attempt to vibrate relatively so as to agglomerate together at certain locations as shown in FIG. 10, due to the fact that Nd atoms exist in the crystal lattice of Ag atoms (crystalline particles of Ag) in a dispersed fashion, as shown in FIG. 6A, no such large void as allowing the vibrating migration of Ag atoms (crystalline particles of Ag) is formed in the crystal lattice of Ag atoms (crystalline particles of Ag), and hence Ag atoms (crystalline particles of Ag) are made difficult to agglomerate.

In other words, while, when large Nd atoms (1.82 angstroms) exist in the crystal lattice of Ag atoms (1.44 angstroms), the crystal lattice of Ag atoms (1.44 angstroms) distorts to form small voids at some locations, as shown in FIG. 6A, since the voids are trapped in internal stress fields (around Nd atoms), no such large void as being exchangeable in position with Ag atoms is formed in the crystal lattice of Ag atoms (crystalline particles of Ag). Due to this, Ag atoms (crystalline particles of Ag) which are subjected to thermal energy cannot vibrate (migrate) sufficiently, and the agglomeration of Ag atoms is suppressed, whereby no fine irregularity is formed on the surface of the silver deposited coat, and hence there is caused no reduction at all in regular reflectivity due to the yellow discoloration.

In addition, as shown in FIG. 4, there exist Bi, Cu and Au (Pd) as additives other than Nd which are to be added to the silver alloy which makes up the silver deposited coat 62, and Bi and Cu also have the same function as that of Nd to suppress the agglomeration of Ag atoms.

Additionally, since too much addition of Nd leads to the reduction in regular reflectivity and thermal conductivity of the silver deposited reflecting surface, 0.2 to 1.0 atomic % of Nd is desirably added.

Then, as shown in FIG. 5, the silver deposited coat 62 is constituted by a silver alloy which contains Bi and Au as additives other than Nd or a silver alloy which contains Ag (98%), Nd (0.2 atomic %), Bi (1.0 atomic %) and Au (0.6 atomic %)

In the third place, the top coat layer (the transparent acrylic resin which is synthesized with the monomer with the glass transition temperature of 60° C. or higher) 64, which is the protective coat formed on the silver deposited coat 62, functions as a gas barrier against gases (water, oxygen and sulfur dioxide) in the atmosphere under high temperature conditions, whereby the contact of the gases (water, oxygen and sulfur dioxide) in the atmosphere with the silver deposited reflecting surface 62*a* is restrained, and the discoloration (yellow discoloration) and corrosion of the silver deposited reflecting surface 62*a* are prevented.

FIG. 7 is a drawing showing glass transition temperatures and results (color differences) of heat resistance tests of examples (experimental examples) 1 to 3 and a comparison example.

Reflecting members of examples (samples) 1 to 3 of the invention are all such that a silver deposited coat 62 constituted by Ag (98%), Nd (0.2 atomic %), Bi (1.0 atomic %) and Au (0.6 atomic %) is formed on the surface of the base 61, and a top coat layer 64 of the acrylic resin which is synthesized with the monomer whose glass transition temperature is 60° C. or higher is formed on the silver deposited coat 62. To be specific, the top coat layer 64 of the example (sample) 1 is formed of an acrylic resin which is synthesized with a monomer whose glass transition temperature is 60° C., the top coat layer 64 of the example (sample) 2 is formed of an acrylic resin which is synthesized with a monomer whose glass transition temperature is 64° C., and the top coat layer 64 of the example (sample) 3 is formed of an acrylic resin which is synthesized with a monomer whose glass transition temperature is 69° C.

On the other hand, the comparison example is such that a silver deposited coat of pure silver is formed on the surface of a base 61 and a top coat layer made of an acrylic resin which is synthesized with a monomer whose glass transition temperature is 27° C. is formed on the silver deposited coat.

These examples (samples) 1 to 3 and the comparison example were kept inside a high-temperature oven of 160° C. for 980 hours to investigate for color differences (degrees to which color changes due to heat) on the silver deposited reflecting surfaces to find that while the comparison example indicated a very high color difference of 14.8 (the degree to which the yellow discoloration occurs is large), the example (sample) 1 and the example (sample) 2 indicated a color difference of 2.9, and the example (sample) 3 indicated a color difference of 2.5, the color differences of all the examples (samples) being smaller than a reference value of 3.0, wherein almost no yellow discoloration was noticed.

Figure 8A:
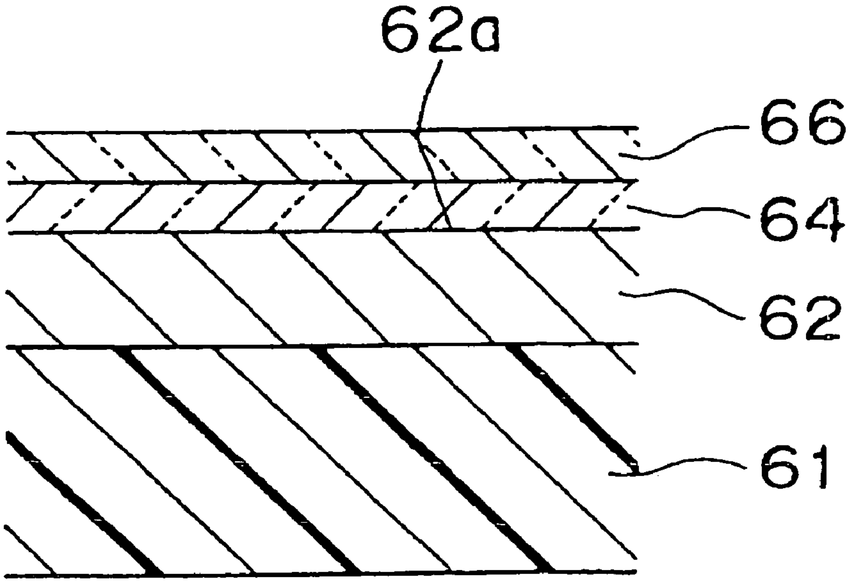
FIG. 8A is an enlarged sectional view of a reflecting surface of an extension reflector which is a main portion of an automotive headlamp which is a second embodiment of the invention.
Figure 8B:
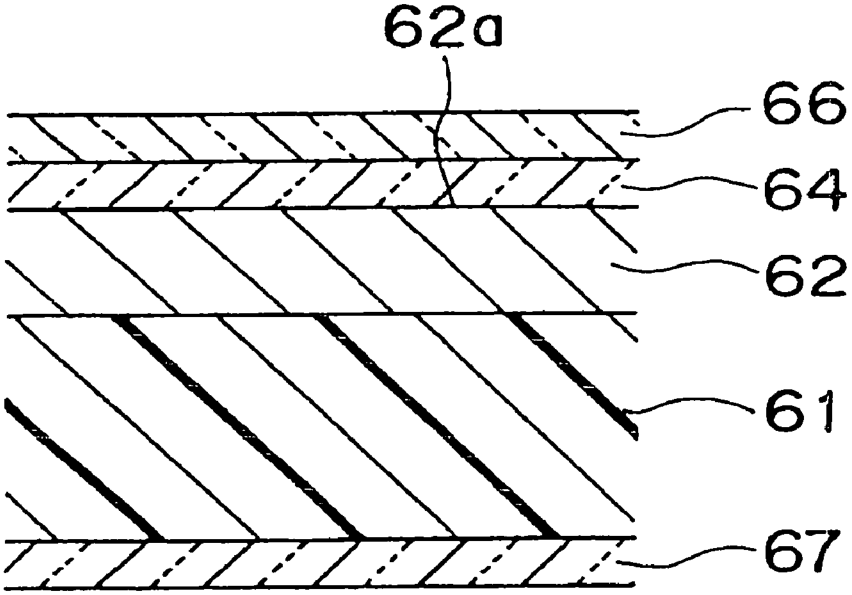
FIG. 8B is an enlarged sectional view of a reflecting surface of an extension reflector which is a main portion of an automotive headlamp which is a third embodiment of the invention.
Figure 9:
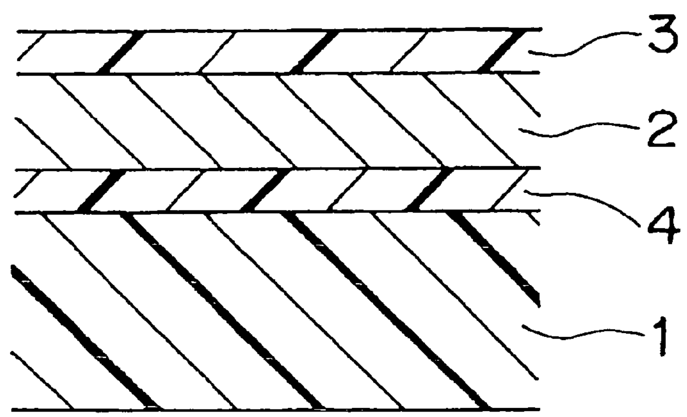
FIG. 9 is an enlarged sectional view of a reflecting surface of a reflecting member such as a conventional reflector and extension reflector.

FIGS. 8A and 8B are enlarged sectional views of extension reflectors according to second and third embodiments of the invention.

While in the first embodiment, the silver deposited coat 62 is formed on the surface of the PBT/PET reflector base 61 through sputtering deposition and the top coat layer 64 of the acrylic resin which is synthesized with the monomer whose glass transition temperature is 60° C. or higher is formed on the silver deposited coat 62, in the second embodiment shown in FIG. 8A, a DLC layer 66, which is superior in durability, thermal resistance and gas barrier properties and which has good adhesion properties to the top coat layer (the acrylic resin layer) 64, is formed to be superposed on the top coat layer 64 in such a manner as to cover it.

In addition, in the third embodiment shown in FIG. 8B, as with the second embodiment, a DLC layer 66 is formed to be superposed on the top coat layer 64 in such a manner as to cover it, and a DLC layer 67, which is superior in durability, thermal resistance and gas barrier properties and which has good adhesion properties to the PBT/PET base 61, is formed on a back side of the base 61.

In these embodiments, since the DLC layer 66, which is superior, in particular, in gas barrier properties, restrains the passage of water, oxygen (heated oxygen) and sulfur dioxide (sweat, exhaust emissions) in the atmosphere, it is possible to eliminate events in which Ag atoms in the silver deposited coat 62 react with water and oxygen (heated oxygen) in the atmosphere to generate silver oxide and in which the same Ag atoms react with sulfur dioxide (sweat, exhaust emissions) in the atmosphere to generate silver sulfide in a more ensured fashion. As a result, the discoloration and corrosion of the silver deposited reflecting surface 62*a* is prevented in more ensured fashion, whereby the high regular reflectivity on the silver deposited reflecting surface 62*a* is maintained over a longer period of time. In particular, in the third embodiment, since the infiltration of the gases in the atmosphere from the back side of the base 61 is also prevented in an ensured fashion, it is possible to ensure further the prevention of the discoloration and corrosion of the silver deposited reflecting surface 62*a*, as well as the maintenance of the high regular reflectivity on the silver deposited reflecting surface 62*a*.

Note that while, in the first to third embodiments, the silver deposited coat 62 is formed direct on the surface of the extension reflector base 61, a construction may be adopted in which an under coat layer is formed on the surface of the base 61 and the silver deposited coat 62 is formed on the under coat layer so formed.

In addition, while, in the first to third embodiments, the invention has been described as being applied to the extension reflector 60, in the event that the invention is applied to reflectors for headlamps, in particular, to a reflector for a recently developed headlamp in which LED is used as a light source, since such a thermal resistance (180° C.) as required for headlamps which incorporate, respectively, therein a discharge bulb, a halogen bulb and an incandescent bulb as a light source is not required, the invention can sufficiently be used for a headlamp reflector as used for the reflector of the headlamp in which LED is used as a light source which requires a thermal resistance of on the order of 160° C.

In addition, while, in the embodiments that have been described heretofore, the extension reflector base 61 is made of the PBT/PET resin, the extension reflector base 61 may be made of something like such a resin which can clear the thermal resistance of 160° C. as ABS resin, AAS resin, PP resin, PC resin and the like.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle lamp comprising:

a reflecting member including:

a synthetic resin base;

a silver deposited coat comprising a silver alloy containing Nd (Neodymium) formed on a surface of the synthetic resin base; and a top coat layer formed on the silver deposited coat and made of a transparent acrylic resin synthesized with a monomer having a glass transition temperature of 60° C. or higher.

2. The vehicle lamp according to claim 1, wherein the top coat layer is formed as a protective coat of the reflecting member.

3. The vehicle lamp according to claim 1, wherein the silver alloy further containing at least one of Bi (Bismuth), Cu (Copper), Au (Gold), and Pd (Lead).

4. The vehicle lamp according to claim 1, further comprising a DLC (Diamond Like Carbon) layer formed on the top coat layer.

5. The vehicle lamp according to claim 1, wherein the reflecting member is an extension reflector.

6. The vehicle lamp according to claim 1 wherein the silver deposited coat is formed directly on a surface of the synthetic resin base.

* * * * *